(12) United States Patent
Pujadas et al.

(10) Patent No.: US 10,757,155 B2
(45) Date of Patent: Aug. 25, 2020

(54) METHOD AND SERVER FOR REAL-TIME DATA STREAMING IN A MEDIA SESSION

(71) Applicant: TOKBOX INC., San Francisco, CA (US)

(72) Inventors: Estanislau Auge Pujadas, San Francisco, CA (US); Manas Pradhan, San Francisco, CA (US); Puneet Shetty, San Francisco, CA (US); Badri Rajasekar, San Francisco, CA (US)

(73) Assignee: NEXMO, INC., San Francisco, CA (US)

( * ) Notice: Subject to any disclaimer, the term of this patent is extended or adjusted under 35 U.S.C. 154(b) by 85 days.

(21) Appl. No.: 15/604,061

(22) Filed: May 24, 2017

(65) Prior Publication Data
US 2018/0343292 A1    Nov. 29, 2018

(51) Int. Cl.
| | |
|---|---|
| H04L 29/06 | (2006.01) |
| H04N 21/472 | (2011.01) |
| H04N 21/2387 | (2011.01) |
| G06F 21/60 | (2013.01) |
| H04N 21/6437 | (2011.01) |

(52) U.S. Cl.
CPC ........ *H04L 65/4084* (2013.01); *G06F 21/606* (2013.01); *H04L 65/403* (2013.01); *H04L 65/60* (2013.01); *H04L 65/607* (2013.01); *H04L 65/608* (2013.01); *H04L 65/80* (2013.01); *H04N 21/2387* (2013.01); *H04N 21/47202* (2013.01); *H04N 21/6437* (2013.01)

(58) Field of Classification Search
CPC ...... H04L 65/60; H04L 65/608; H04L 65/403
See application file for complete search history.

(56) References Cited

U.S. PATENT DOCUMENTS

| | | | | |
|---|---|---|---|---|
| 7,154,897 | B2* | 12/2006 | Kitayama | H04Q 3/60 370/401 |
| 8,503,643 | B2* | 8/2013 | McKee | H04M 3/42357 379/201.01 |
| 8,788,680 | B1* | 7/2014 | Naik | H04L 67/306 709/227 |
| 9,137,086 | B1* | 9/2015 | Naik | H04L 29/0602 |
| 9,167,098 | B1* | 10/2015 | Anderson | H04L 12/1827 |
| 9,197,701 | B1* | 11/2015 | Petrov | H04L 65/1066 |
| 9,325,853 | B1* | 4/2016 | Marinov | H04M 3/568 |

(Continued)

*Primary Examiner* — Lashonda T Jacobs
(74) *Attorney, Agent, or Firm* — FisherBroyles, LLP; Joseph Pagnotta

(57) ABSTRACT

The method comprising performing by a server following steps: receiving a stream of data from a first client of a media session; requesting to a load balancer which routing device the server has to use to forward the received stream to a plurality of other clients of the media session; setting a first parameter of the first routing device to a first value, and a second parameter to a second value; receiving a request to receive said received stream from a second client of the media session; and checking whether the first routing device is valid, wherein the server forwarding the received stream to the second client through the first routing device if the first routing device being valid and also decreasing the first parameter by one, or the server requesting a second routing device to be used to the load balancer and further performing the setting of the first and second parameters for the second routing device.

20 Claims, 2 Drawing Sheets

(56) References Cited

U.S. PATENT DOCUMENTS

| | | | |
|---|---|---|---|
| 9,712,570 B1* | 7/2017 | Ivov | H04L 65/1089 |
| 9,712,578 B2* | 7/2017 | Klein | G06F 16/00 |
| 9,801,158 B1* | 10/2017 | Yuan | H04M 3/465 |
| 9,843,606 B1* | 12/2017 | Vendrow | H04L 41/08 |
| 10,104,166 B2* | 10/2018 | Chauhan | H04L 69/16 |
| 2008/0069011 A1* | 3/2008 | Sekaran | H04L 12/1813 |
| | | | 370/260 |
| 2008/0205267 A1* | 8/2008 | El Barachi | H04L 65/1069 |
| | | | 370/230 |
| 2011/0161519 A1* | 6/2011 | Siegel | H04L 65/1016 |
| | | | 709/238 |
| 2011/0252127 A1* | 10/2011 | Iyengar | G06F 9/5033 |
| | | | 709/224 |
| 2011/0314394 A1* | 12/2011 | Kilmer | H04L 12/1822 |
| | | | 715/755 |
| 2013/0036228 A1* | 2/2013 | Take | H04L 67/14 |
| | | | 709/227 |
| 2015/0373057 A1* | 12/2015 | Ezell | H04L 67/02 |
| | | | 709/204 |
| 2017/0279968 A1* | 9/2017 | Fadili | H04M 3/562 |
| 2018/0097863 A1* | 4/2018 | Ivov | H04L 65/602 |
| 2019/0007466 A1* | 1/2019 | Ivov | H04L 47/12 |
| 2019/0141089 A1* | 5/2019 | Loheide | H04N 5/76 |

\* cited by examiner

METHOD AND SERVER FOR REAL-TIME DATA STREAMING IN A MEDIA SESSION

FIELD OF THE INVENTION

The present invention generally relates to media communications in conferencing platforms. In particular, present invention relates to a method and server for real-time data streaming in media conferences such as those based on WebRTC or on SIP/RTP/RTCP.

BACKGROUND OF THE INVENTION

WebRTC is a software library that contains a collection of protocols and codecs implementations and that enables real time communications between peers on the Internet. WebRTC also defines the API interfaces provided by some software applications such as browsers to provide access to these communication capabilities. WebRTC enables sending media data (audio and video) peer to peer, as well as data through data channels. Present invention will focus on the former.

Peer-to-Peer Mesh Architecture:

WebRTC by default enables peer to peer communication. In a peer-to-peer mesh architecture peers can communicate directly if they can find the public IP addresses of the other peers or through a TURN (Traversal Using Relays around NAT) server otherwise. However, this model has scalability issues since each peer would have to send as many streams as peers it is communicating with, and the same number of streams is going to be received. This model scales poorly after a certain limit, and this is why other architectures such as one based on an SFU (Selective Forwarding Unit) have gained popularity in multiparty and broadcast use cases.

SFU-Based Architecture:

An SFU (Selective Forwarding Unit) is a routing device that is placed in between peers that want to communicate to each other, and which sends the streams it receives selectively to the peers interested in that stream. By using this model, each client needs to send its stream only once, which means that it only has to send one stream. So, it is possible to develop an SFU that will handle the communication between peers, selecting which streams will be received by each client. An SFU-based architecture is more suitable than the Peer-to-Peer mesh architecture for use cases in which more scale is needed.

Peer Connection:

In WebRTC, a client that wants to send a stream of data to another client or that wants to receive a stream from another client will create a Peer Connection. A Peer Connection in WebRTC is an object that allocates all the resources and handles the logic for clients to send streams to each other. Since a client can potentially send and receive multiple streams, due to the lack of support for Peer Connection renegotiations in some implementations of WebRTC, it was more convenient to use multiple peer connections in a client, one for each stream that has to be received or sent. However, when a client receives multiple streams of data from a single endpoint, the scenario has changed, and more recent implementations allow using a single peer connection that can be used to send and receive multiple streams. Using single peer connection has some advantages such as; clients need to allocate fewer resources, use fewer threads, open fewer sockets; clients also will successfully receive all the streams or neither, which means fewer inconsistencies for the end user experience. Also, the use of a single peer connection means that there is just a single point of failure for each client, so either the client will be able to receive and send all the necessary streams or in case of failure the client will send and receive no stream. This is positive from a user experience perspective as no awkward middle ground scenario can happen in which for instance a client receives just part of the streams, so it can hear and see some of the participants of the conversation but not others. For these reasons the concept of Single Peer Connection, in which clients use a single Peer Connection to send streams to or receive streams from an SFU and renegotiate when a change in state is necessary, is becoming popular.

Stream Quality

When talking about clients, we say that a client sends a stream or receives a stream. A stream is stream of data, generally over UDP that is sent by the client or received by the client. Audio bitrate, video bitrate, packet loss, latency, jitter, are some of the stream quality metrics that can help to determine statistically if the experience of the end user is good. So, a good stream quality is characterized by high audio and video bitrate, low packet loss and low jitter.

Following, a state-of-the art video conferencing platform using as underlying technologies WebRTC and WebSockets is described. Firstly, the concept of a session is defined, i.e. an isolated group of clients that are part of a logical unit. All the clients in a session are expected to be able to interact with each other, which includes sending/receiving signal and sending/receiving media. The concept of a stream of data is also defined as a stream of bytes that is sent from one client and potentially received by other clients. When using an SFU, the SFU will be responsible of receiving the streams of different clients and forward them to the clients that have expressed interest in those streams. FIG. 1 shows a graph with the relevant components and the protocols used to interact amongst them.

First of all, there are the clients. The clients are in general either a web application running on a browser that has WebRTC enabled, or another device that can run a WebRTC engine that has been compiled for that particular platform. This is usually achieved by means of SDKs that can be run in multiple platforms such as iOS, Android, Windows, MacOS and Linux amongst others. In practice, these endpoints need to have the following capabilities: Can create Websocket connections to a public Internet endpoint and have a WebRTC engine that supports SDP negotiations, ICE workflow, encoding and decoding of audio and video streams, and use RTP (or its secure version SRTP) for sending or receiving media data and RTCP (or its secure version SRTCP) to control the RTP/SRTP media flow.

Then there are all the platform components. An SFU is a Selective Forwarding Unit that supports WebRTC, and can receive media streams sent by clients, and selectively forward these same streams to other clients that may be interested in them. The SFU also supports ICE protocol in order to establish the connection with the client, even in those cases where the client does not have a public IP address or even lies behind a firewall. More importantly, the SFU needs to implement the RTP/RTCP (and SRTP/SRTCP) protocols to be able to forward the streams between clients.

A further component is the messaging server. Since WebRTC does not define a standard mechanism to handle SDP negotiations, it is necessary to have a component that handles signaling between clients. When using WebRTC, clients cannot assume their network conditions, which mean that it is possible, that in case of having two clients: they both have public addresses; one of has a public address and the other does not; none of them has a public address; either or both of them are behind a proxy. This means that a WebRTC platform cannot assume anything about the reachability of the clients and must provide a mechanism so that they can exchange SDPs as necessary. The messaging server is a component with a public IP address that allows clients to connect using WebSockets. This means that any client regardless of the conditions of the network it finds itself should be able to create a TCP connection over TLS to a messaging server. Then, the messaging server can be used as a router for messages between clients that want to signal each other.

Also, it is important to bear in mind that before a WebRTC session can start, clients need to exchange SDPs to be able to agree on the parameters under which the session will take place. So, the messaging server allows this signaling exchange to happen between clients or between a client and the SFU. In this latter case the Messaging server sends/receives the messages aimed at/coming from the SFU for instance through a connection based on TCP. As there is no specific standard protocol to be used in this case an ad-hoc proprietary protocol can be used.

The messaging server may act as intermediary in the communication between a client and the load balancer or between the load balancer and the SFU, although it may not be strictly necessary as these elements may be directly reachable. As there is no specific standard protocol to be used in the communication between the messaging server and the load balancer an ad-hoc proprietary protocol can be used, for instance based on HTTP.

The load balancer is the component that is aware of which components are available in the platform (e.g. different SFUs), where they can be found and which is their state. So, when a resource is needed by another component, the load balancer is the one that provides the resource that best satisfies the needs of the request.

When a client wants to send a stream of data to the SFU, the flow is the following:
  The client sends a request to the messaging server to send a stream to the session.
  The messaging server accepts the request, and sends a request to the client to generate an SDP offer.
  The clients send a SDP offer to the messaging server which in turn forwards it to the SFU.
  The SFU replies with an SDP answer that the messaging server forwards to the client.
  At this point, the client and the SFU both know about the existence of each other, and have respectively the IP addresses of each other, so through an ICE workflow the client can reach the SFU and send the stream to the SFU.

When a client wants to receive a stream of data from the SFU, the flow is the following:
  The client sends a request to the messaging server to receive a stream from the session
  The messaging server accepts the request, and sends a request the SFU to generate an SDP offer
  The SFU sends the generated SDP offer to the messaging server which in turn forwards it to the client.
  The client replies with an SDP answer to the messaging server which in turn forwards it to the SFU.
  At this point, the client and the SFU both know about the existence of each other, and respectively have the IP addresses of each other, so through an ICE workflow the SFU can reach the client and can send the stream to the client.

These flows are the basic flows implemented in a state-of-the-art platform such as TokBox. As it can be appreciated, with these flows the messaging server does not have to decide which SFU must be used, once an SFU is assigned for a session all the streams are allocated there. This means that in can happen that an SFU becomes overloaded or it can become unreachable, but streams would still be assigned to it.

Apart from that, there are known some patent or patent application in this field. For instance, patent application WO-A1-2002060126 describes the problem of conference calls including a relatively large number of participants, more participants than a single MCU (multipoint control unit) is capable of facilitating. In this case a potential solution is cascading two or more MCUs to increase the number of endpoints in a multipoint conference. WO-A1-2002060126 proposes a method to automatically configure the MCU cascading with the aim of optimizing network bandwidth. An example provided is the case where multiple participants from a first campus that want to join a conference managed by a MCU located in a second campus. In this case it is more optimum to make them connect to the MCU in the first campus and connect this MCU with the MCU in the second campus. Then just one connection is needed between both campuses, namely the connection between both MCUs, instead of needing multiple connections between the conference call participants located in the first campus and the MCU in the second campus.

U.S. Pat. No. 7,800,642 defines a cascading conference system in which there is a master MCU and one or more slave MCUs. The master MCU has a multimedia connection to each one of the slave MCUs. The multimedia connection between the master MCU and each one of the slave MCUs is similar to a multimedia connection with an endpoint of a conferee. The cascading conference session architecture is defined before the beginning of the conference.

As it can be appreciated from the cited prior art references a setup comprising multiple MCUs collaborating to provide a single multi party conference is well-known. However, none of the previously cited prior art describe any procedure by which participants are dynamically allocated to different SFUs, according to their respective load, so that conferences can be managed according to efficiency principles that exploits the capacity of the different SFUs without overloading them whilst limiting the interactions with a global load balancer. Therefore there is a need for methods and systems for providing the above.

DESCRIPTION OF THE INVENTION

To that end, embodiments of the present invention provide according to an aspect a method for real-time data streaming in a media session, the method comprising a server performing the following steps: receiving a stream of data from a first client of a media session, said stream of data being intended to be received by a plurality of other clients of the media session; requesting to a load balancer which routing device of a plurality of routing devices such as a Selective Forwarding Units (SFUs) the server has to use to forward the received stream of data to the plurality of other clients of the media session; receiving from the load balancer an indication of a first routing device to be used by the server for said forwarding, the server further a) setting a first parameter of the first routing device to a first value, and b) setting a second parameter of the first routing device to a second value; receiving a request to receive said received stream of data from a second client of the plurality of other clients of the media session; and checking whether the first routing device is valid by checking that the first parameter is bigger than zero and that a time no longer than the second parameter has passed since receiving the indication.

The server forwards the received stream of data to the second client through the first routing device if the first routing device is valid and also decreases the first parameter by one. Otherwise the server requests a second routing device of the plurality of routing devices to be used to forward the received stream of data to the load balancer, further performs previous steps a) and b) for the second routing device, further forwards the received stream of data to the second client through the second routing device and also decreases the first parameter by one for the second routing device.

According to the invention, the first parameter defines a maximum number of streams of data the first routing device has reserved for allocation by the server, and the second parameter defines a maximum period of time the first routing device has reserved capacity for allocation of said maximum number of streams of data.

In an embodiment, the server, before said checking step being performed, further checks whether the second client has already streams of data allocated. In case the second client has already streams of data allocated, the server forwards the received stream of data to the second client through a routing device previously used by the second client.

In an embodiment, the first routing device is the routing device of the plurality of routing devices having a largest available capacity. In another embodiment, the first routing device is the routing device of the plurality of routing devices which is geographically closer to the clients taking part in the media session with available capacity. In this latter case, the checking step of whether the first routing device is valid further comprises c) checking whether the first routing device is close in distance to the second client.

In an embodiment, the first routing device and the second routing device run in a same data center and are operatively connected.

The load balancer preferably stores, every certain period of time, a current available capacity state of the plurality of routing devices. Preferably, said certain period of time is equal or not longer to said second parameter.

According to the invention the stream of data can comprise audio and/or video data.

In a preferred embodiment, the media session comprises a WebRTC session. The clients in this case can comprise a web application running on a web-browser having WebRTC enabled or a computing device running a WebRTC engine. In other embodiments, the media session can comprise SIP/RTP/RTCP.

Other embodiments of the invention that are disclosed herein also include according to another aspect a server for real-time data streaming in a media session configured to perform the method embodiments steps of the first aspect of the invention.

Besides, software programs to perform the method embodiment steps and operations summarized above and disclosed in detail below may also be provided. More particularly, a computer program product is one embodiment that has a computer-readable medium including computer program instructions encoded thereon that when executed on at least one processor in a computer system causes the processor to perform the operations indicated herein as embodiments of the invention.

BRIEF DESCRIPTION OF THE DRAWINGS

The previous and other advantages and features will be more fully understood from the following detailed description of embodiments, with reference to the attached drawings, which must be considered in an illustrative and non-limiting manner, in which.

DETAILED DESCRIPTION OF THE INVENTION

Figure 1:
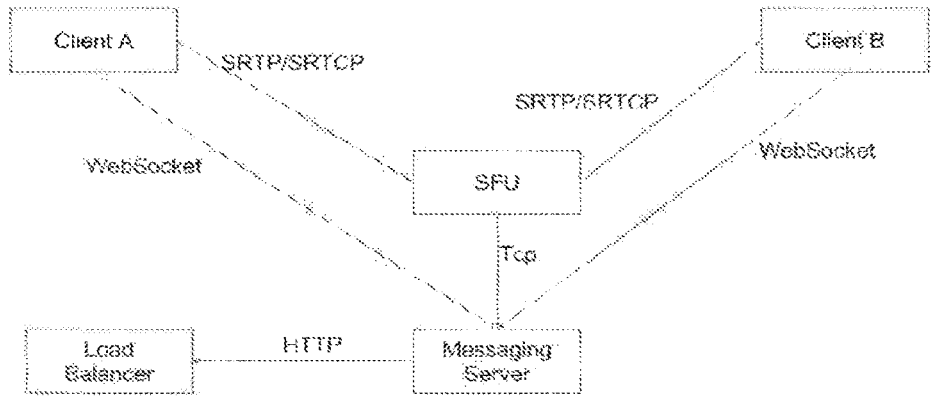
FIG. 1 illustrates a state-of-the-art video conferencing platform using as underlying technologies WebRTC and WebSockets.
Figure 2:
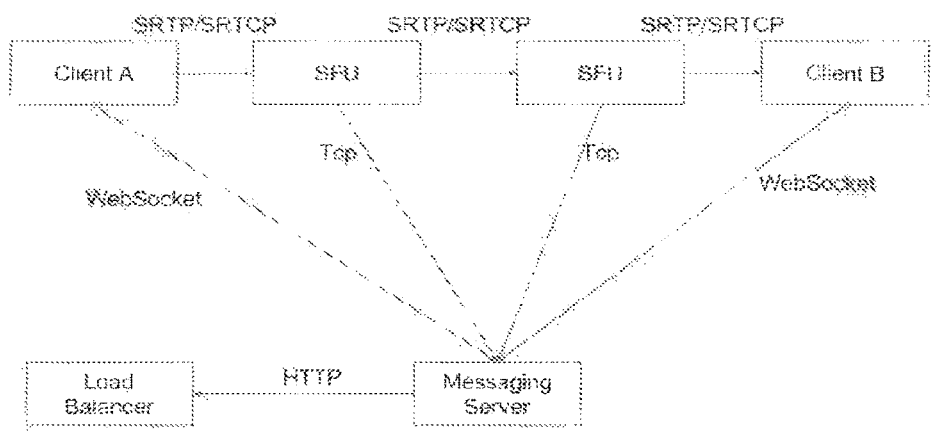
FIG. 2 illustrates an embodiment of the proposed system architecture to implement the proposed method.

FIG. 2 illustrates an embodiment of the different components provided by the invention for real-time data streaming in a media session such as a WebRTC session, among others. As can be seen the components (clients, routing elements, in this particular case SFUs, messaging server and load balancer) are the same as the ones described in FIG. 1, however, in this case there is SFUs chaining (i.e. a plurality of interconnected SFUs is now provided), on which the invention is based to overcome the existing issues of the state-of-the-art.

SFU chaining consists in forwarding a stream of data from one SFU to another, so that a client A can send a stream of data to one SFU, and another client B can receive that stream of data from another SFU. The problem with no SFU chaining is that the number of clients in a session comes limited by the supported number of clients of a single SFU or the number of clients supported by the messaging server (or simply 'server' as termed in the claims). In order to make the architecture scalable there is a need to chain multiple SFU instances together to increase the number of streams of data that can be part of a session.

For instance, if it is assumed that an SFU can support 1000 clients, this means that in a single SFU there can be, for example, one client sending a stream of data and 999 clients can receive that stream of data. When chaining two SFUs together, one client can send a stream of data, and 1997 (998+999) clients can receive that stream of data. Note that one additional stream of data is used for transferring the stream between SFUs. When chaining a plurality of n SFUs together, one client can send a stream of data and (1000−(n−1)−1)+999*(n−1)=998n+1, clients can receive that stream of data. (The SFU receiving the stream from the client uses one stream of its total capacity to receive it, (n−1) to send it to the other SFUs, and thus (1000−(n−1)−1) remain available to deliver the stream of data to clients. In turn each of the other (n−1) SFUs use one stream of their total capacity to receive the stream of data and thus each can deliver it to up to 999 clients). So, a linearly scalable architecture is obtained.

It should be noted that in FIG. 2 all the client's still connect to the same messaging server, which means that this architecture still can have some limitations in terms of scalability. However, it allows scaling up to as many SFUs as supported by the messaging server.

One of the main challenges of present invention design is how to distribute the streams of data among multiple SFUs. In the past, since only one SFU was associated to a messaging server, all streams of data that had to be created were allocated to that SFU. However, now these streams of data can be load balanced amongst multiple instances as needed.

Therefore, the constraints present invention mainly considers when thinking about the design of the load balancing algorithm are:

The load balancing algorithm preferably should be compatible with Single Peer Connection in order to obtain the benefits of that configuration that was previously described. This means that each stream of data that a client can send or receive must come from the same SFU. So, the load balancing algorithm in this case cannot distribute streams of data independently but must be aware of which clients own which streams and make sure they all go to the same SFU.

The load balancing algorithm preferably should also be aware of the current state of the platform. When allocating streams of data to an SFU, this should be done ensuring that the SFU has enough capacity to accept it at that time. So, the load balancer must have access to the latest known state of all the components.

The load balancing algorithm preferably should also allocate streams of data to avoid overloading a single SFU. If an SFU is overloaded and other SFUs are mostly free, this will mean that the quality of the streams in the session may get worse that it may be with a different stream distribution.

It is the messaging server's responsibility to implement the logic of where a stream of data is allocated, since it keeps all the state of a session, which clients are part of a session and the streams of data that they have. In the load balancing algorithm, there are the concepts of first parameter (or block size parameter), and current SFU.

Current SFU is the SFU instance which is currently assigned for allocation to new connections. It has two states, valid and invalid. An SFU is invalid if it was received by the load balancer more than a certain period of time, preferably more than 60 seconds ago.

The block size parameter is an integer greater than 0, which defines the maximum number of streams of data that can be allocated to the current SFU.

Figure 3:
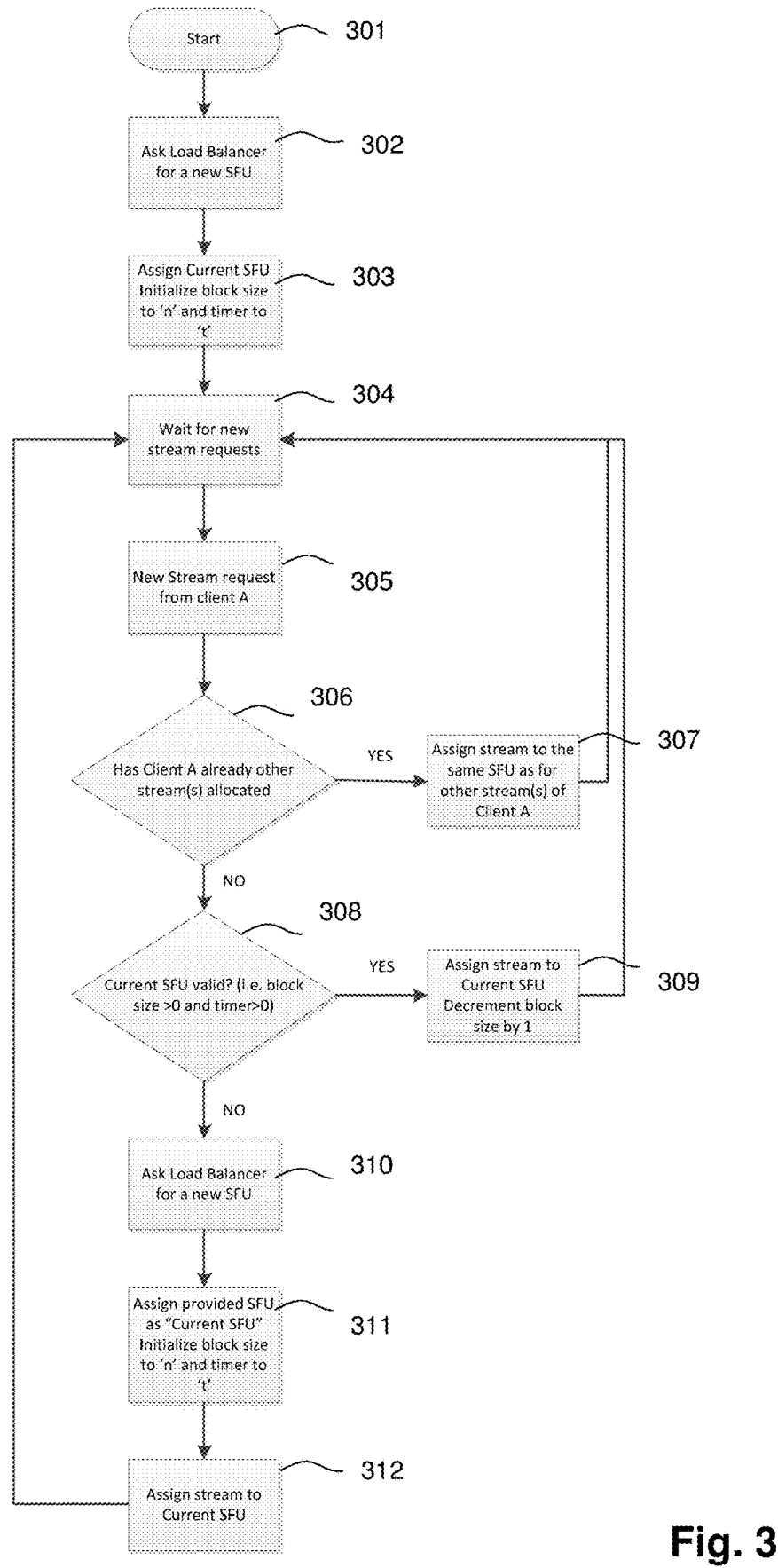
FIG. 3 is a flowchart of method steps for real-time data streaming in a media session, according to an embodiment of the present invention.

So, according to an embodiment the messaging server will use the load balancer to decide where to allocate a stream of data following the process (algorithm) detailed in FIG. 3:

1. At step 302, the messaging server asks the load balancer for a new SFU;
2. At step 303, the messaging server initializes current SFU to the SFU provided by the load balancer, and initializes block size parameter to the desired value 'n' (e.g. 50) and a second parameter (or timer) to a predefined time T (e.g. 60 seconds).
3. At this point, step 304, the system waits for request for new streams of data;
4. Upon a new stream request from client A (step 305), the messaging server checks, step 306, whether that Client A has already one or more streams of data allocated. If yes (step 307), the same SFU as for previous streams of data is allocated.
5. If the client has no streams of data allocated, step 308, the messaging server checks, step 309, whether the current SFU is valid (timer bigger than 0) and the block size is bigger than 0. If yes, step 309, then it returns current SFU and subtract one to block size.
6. Otherwise, step 310, the messaging server asks the load balancer for a new SFU, update the current SFU with the new SFU received from the load balancer and initializes the block size and the timer again (step 311), and assigns the stream to the current SFU (step 312).

After assigning the stream of data to an SFU at any of the points in previous process, the process goes back to step 3 to wait for new requests.

With the process described in FIG. 3, the above-mentioned constraints are satisfied because:

A client that already has a stream of data allocated will be allocated the same SFU. This makes sure that the process is compatible with Single Peer Connection.

The fact that there is a timeout to invalidate an SFU forces the messaging server to request a new SFU instance to the load balancer, which forces the load balancing algorithm to always make a decision with an updated version of the state of the platform.

The block size helps in the sense that if too many requests come in at the same time to create a stream, an SFU will not be overloaded, because the messaging server will be forced to query the load balancer for a new server. However, with a sufficiently big block size, the number of requests should not generate much load on the load balancer.

According to another embodiment, in a more flexible approach for distribution load, in particular when no Single Peer Connection constraints exists, the messaging server upon receiving a new stream request from client A (step 305) only checks whether the current SFU is valid (timer bigger than 0) and whether the block size is bigger than 0. That is, the messaging server directly performs step 308 of the above-described process without executing steps 306 and 307.

Following, a specific exemplary embodiment of the proposed method is explained when allocating 1000 streams of data to multiple SFUs. Preferably, in this case the block size (first parameter) is set to be between 50 to 100 and the timer (second parameter) is set to 60 seconds. Besides, there will be three SFUs, SFU_A, SFU_B and SFU_C, one messaging server and one load balancer to make things simpler. The default SFU set for the messaging server is SFU_A.

According to this specific exemplary embodiment, there are 1001 clients connected to the messaging server. One client sends a stream of data, and the other 1000 clients want to receive that stream. As soon as this happens, this is the flow:

1. Let's assume that 500 clients send a request to the messaging server to receive the stream of data.
2. The Messaging server preferably allocates streams of data strictly, so it has to serialize the requests, and allocate the first 50 streams to the current SFU server that is set by default, SFU_A.
3. When stream of data 51 comes in, the messaging server queries the load balancer for a new SFU, which could be any of SFU_A, SFU_B or SFU_C. Let's assume that it's SFU_A again.
4. Up to 100 streams of data will have been allocated to SFU_A, and none to SFU_B and SFU_C.
5. When stream of data 101 comes in, the process starts over, and it continues until the 500 streams are allocated amongst SFU_A, SFU_B and SFU_C. Let's assume that the stream distribution is, SFU_A: 300, SFU_B: 100 and SFU_C: 100
6. If client 501 attempts to receive the stream of data as well, the messaging server will query again for an SFU instance and gets SFU_C. At that instance, the load balancer will assume that the state is SFU_A: 300, SFU_B: 100 and SFU_C: 150, even though the actual state is SFU_A: 300, SFU_B: 100 and SFU_C: 101.

7. In 60s the SFU_C assignation times out and thus becomes invalid, and the load balancer's state of the platform is updated to SFU_A: 300, SFU_B: 100 and SFU_C: 101.
8. When client 502 attempts to receive the stream of data, the load balancer assigns SFU_B, and then the state of the load balancer becomes SFU_A: 300, SFU_B: 150 and SFU_C: 101, even though the state is SFU_A: 300, SFU_B: 101 and SFU_C: 101.
9. And this flow would go on until all 1000 clients are receiving the stream of data from the first client.

The challenge of choosing the right value for the block size parameter and the timer parameter is preferably: If the block size is too small, too many requests need to be made to the load balancer; if the block size is too big, the load balancer assumes that too much capacity is taken; if the timer is too small, again too many requests have to be made to the load balancer; if the timer is too big, the messaging server may use a current SFU whose state may have changed dramatically.

According to the invention, there can be multiple load balancers spread across different datacenters. The messaging server can potentially make requests to any of the load balancers depending on their state and location. One of the implementation problems found is that when using the block size it is important that the load balancer is aware of it and keep state of how many streams may be allocated to each SFU. At the same, time, when a load balancer returns an SFU instance assuming that "block size" streams will be allocated there, nothing can ensure that those "block size" streams will actually be allocated. This means that a cleanup mechanism is necessary to make sure that no used capacity is returned to the load balancer, so that it can be provided to another session. To make this happen a full snapshot of the current state of an SFU can be stored in the load balancer's state at least every "timeout" seconds, being "timeout" the value that is used to invalidate an SFU in the load balancing algorithm, as interval to provide the full snapshot. This makes sure that any resources that are not used are freed and available for other sessions, and the messaging server is forced to query the load balancer again for another SFU instance.

One possible optimization of the invention can be achieved for some scenarios by means of the load balancer using additional criteria to select the SFU. A first additional factor may be geolocation. In this case the load balancer may assign an SFU upon request which is geographically closer to the clients taking part in the session. This way the latency is minimized. If that's the case, then the allocation algorithm would differ slightly, because the messaging server would need to check whether "Current SFU" is close in distance to the client (in addition to having block size >0 and timer >0) and in case not ask the load balancer to find a SFU instance that is close in distance to the client. As a result more than one "Current SFU" may be valid at the same time.

Additionally the load balancer may decide to assign a new SFU which runs in the same data center as the SFU previously assigned to the same session. This way the connection quality can be improved as the connectivity inside the data center is optimum and lesser quality connections (e.g. through the Internet) between SFUs participating in a session are avoided.

A variation of this later approach is the load balancer assigning a new SFU which is connected by means of a high-quality connection (e.g. dedicated link) to the SFU previously assigned to the same session. This way the routes through the Internet are minimized and specialized links are used instead whenever possible.

While the foregoing is directed to embodiments of the present invention, other and further embodiments of the invention may be devised without departing from the basic scope thereof. For example, other aspects may be implemented in hardware or software or in a combination of hardware and software.

Additionally, the software programs included as part of the invention may be embodied in a computer program product that includes a computer useable medium. For example, such a computer usable medium can include a readable memory device, such as a hard drive device, a flash memory device, a CD-ROM, a DVD/ROM, or a computer diskette, having computer readable program code segments stored thereon. The computer readable medium can also include a communications link, either optical, wired, or wireless, having program code segments carried thereon as digital or analog signals.

The scope of the present invention is determined by the claims that follow.

The invention claimed is:

1. A method performed by a messaging server and a load balancer for balancing the data streaming load of a media session being conducted by a plurality of clients, where the plurality of clients are connected to routing devices, and where the routing devices are connected to each other and exchange media data for the media session, the method comprising the messaging server:
   A. sending to the load balancer, a request for the identity of a routing device to which clients may connect to participate in the media session;
   B. receiving from the load balancer, an identity of a first routing device to which clients may connect to participate in the media session;
   C. receiving a plurality of requests to join the media session from a corresponding plurality of clients and instructing those clients to connect to the first routing device until a predetermined number of clients have been instructed to connect to the first routing device, or until a predetermined period of time expires since the identity of the first routing device was received from the load balancer;
   D. sending to the load balancer, a renewed request for the identity of a routing device to which clients may connect to participate in the media session when the predetermined number of clients have been instructed to connect to the first routing device, or when the predetermined period of time expires since the identity of the first routing device was received from the load balancer;
   E. receiving, in response to the renewed request and from the load balancer, an identity of a renewed routing device to which clients may connect to participate in the media session;
   F. receiving a plurality of requests to join the media session from a corresponding plurality of clients and instructing those clients to connect to the renewed routing device until a predetermined number of clients have been instructed to connect to the renewed routing device, or until a predetermined period of time expires since the identity of the renewed routing device was received from the load balancer; and
   G. repeating steps D through F when the predetermined number of clients have been instructed to connect to the renewed routing device, or when the predetermined period of time expires since the identity of the renewed routing device was received from the load balancer.

2. The method of claim 1, wherein the first routing device and the renewed routing device are different routing devices, and where the first routing device and the renewed routing device are connected to each other and exchange media data for the media session.

3. The method of claim 2, wherein the first routing device and the renewed routing device are located in the same data center.

4. The method of claim 1, wherein the first routing device and the renewed routing device are the same routing device.

5. The method of claim 1, wherein step F further comprises the messaging server:
checking, each time that a request to join the media session is received from a client, to determine if the client is already receiving media data from a specific routing device;
instructing that client to connect to the specific routing device when the client is already receiving media from the specific routing device; and
instructing that client to connect to the renewed routing device when the client is not already receiving media from a specific routing device.

6. The method of claim 1, wherein the load balancer, in response to a renewed request for the identity of a routing device to which clients may connect, instructs the messaging server to use a routing device participating the media session that has the greatest unused capacity.

7. The method of claim 1, further comprising the load balancer periodically receiving load status messages from the routing devices participating in the media session, wherein each load status message indicates the current load state of a routing device.

8. The method of claim 7, wherein a period of time that elapses between the load balancer receiving first and subsequent load status messages from each of the routing devices participating in the media session is approximately the same duration as the predetermined period of time.

9. The method of claim 7, wherein a period of time that elapses between the load balancer receiving first and subsequent load status messages from each of the routing devices participating in the media session is shorter than the predetermined period of time.

10. The method of claim 1, wherein the routing devices are selective forwarding units.

11. A system for balancing the data streaming load of a media session being conducted by a plurality of clients, where the plurality of clients are connected to routing devices, and where the routing devices are connected to each other and exchange media data for the media session, comprising:
means for sending to a load balancer, a request for the identity of a routing device to which clients may connect to participate in the media session;
means for receiving from the load balancer, an identity of a first routing device to which clients may connect to participate in the media session;
means for receiving a plurality of requests to join the media session from a corresponding plurality of clients and instructing those clients to connect to the first routing device until a predetermined number of clients have been instructed to connect to the first routing device, or until a predetermined period of time expires since the identity of the first routing device was received from the load balancer;
means for sending to the load balancer, a renewed request for the identity of a routing device to which clients may connect to participate in the media session when the predetermined number of clients have been instructed to connect to the first routing device, or when the predetermined period of time expires since the identity of the first routing device was received from the load balancer;
means for receiving, in response to the renewed request and from the load balancer, an identity of a renewed routing device to which clients may connect to participate in the media session; and
means for receiving a plurality of requests to join the media session from a corresponding plurality of clients and instructing those clients to connect to the renewed routing device until a predetermined number of clients have been instructed to connect to the renewed routing device, or until a predetermined period of time expires since the identity of the renewed routing device was received from the load balancer.

12. A system configured to balance the data streaming load of a media session being conducted by a plurality of clients, where the clients are connected to routing devices, and where the routing devices are connected to each other and exchange media data for the media session, the server comprising:
a load balancer comprising at least one processor; and
a messaging server comprising at least one processor, wherein the messaging server is configured to perform a method comprising:
A. sending, to the load balancer, a request for the identity of a routing device to which clients may connect to participate in the media session;
B. receiving, from the load balancer, an identity of a first routing device to which clients may connect to participate in the media session;
C. receiving a plurality of requests to join the media session from a corresponding plurality of clients and instructing those clients to connect to the first routing device until a predetermined number of clients have been instructed to connect to the first routing device, or until a predetermined period of time expires since the identity of the first routing device was received from the load balancer;
D. sending, to the load balancer, a renewed request for the identity of a routing device to which clients may connect to participate in the media session when the predetermined number of clients have been instructed to connect to the first routing device, or when the predetermined period of time expires since the identity of the first routing device was received from the load balancer;
E. receiving, in response to the renewed request and from the load balancer, an identity of a renewed routing device to which clients may connect to participate in the media session;
F. receiving a plurality of requests to join the media session from a corresponding plurality of clients and instructing those clients to connect to the renewed routing device until a predetermined number of clients have been instructed to connect to the renewed routing device, or until a predetermined period of time expires since the identity of the renewed routing device was received from the load balancer; and
G. repeating steps D through F when the predetermined number of clients have been instructed to connect to the renewed routing device, or when the predetermined period of time expires since the identity of the renewed routing device was received from the load balancer.

13. The system of claim 12, wherein the first routing device and the renewed routing device are different routing devices, and where the first routing device and the renewed routing device are connected to each other and exchange media data for the media session.

14. The system of claim 13, wherein the first routing device and the renewed routing device are located in the same data center.

15. The method of claim 12, wherein the first routing device and the renewed routing device are the same routing device.

16. The system of claim 12, wherein when the messaging server performs step F, step F further comprises the messaging server:
   checking, each time that a request to join the media session is received from a client, to determine if the client is already receiving media from a specific routing device;
   instructing that client to connect to the specific routing device when the client is already receiving media from the specific routing device; and
   instructing that client to connect to the renewed routing device when the client is not already receiving media from a specific routing device.

17. The system of claim 12, wherein the load balancer, in response to a renewed request for the identity of a routing device to which clients may connect, instructs the messaging server to use a routing device participating the media session that has the greatest unused capacity.

18. The system of claim 12, further comprising the load balancer periodically receiving load status messages from the routing devices participating in the media session, wherein each load status message indicates the current load state of a routing device.

19. The system of claim 18, wherein a period of time that elapses between the load balancer receiving first and subsequent load status messages from each of the routing devices participating in the media session is approximately the same duration as the predetermined period of time.

20. The system of claim 18, wherein a period of time that elapses between the load balancer receiving first and subsequent load status messages from each of the routing devices participating in the media session is shorter than the predetermined period of time.

* * * * *